(12) United States Patent
Maurer

(10) Patent No.: US 7,194,142 B2
(45) Date of Patent: Mar. 20, 2007

(54) SELECTIVE THICKENING OF DARK FEATURES BY BIASED SHARPENING FILTERS

(75) Inventor: Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 10/377,476

(22) Filed: Feb. 28, 2003

(65) Prior Publication Data

US 2004/0170339 A1 Sep. 2, 2004

(51) Int. Cl.
*G06K 9/42* (2006.01)
(52) U.S. Cl. .................... 382/258; 382/266; 358/3.27
(58) Field of Classification Search ............. 382/169, 382/258, 263, 266, 274; 358/3.01, 3.27
See application file for complete search history.

(56) References Cited

U.S. PATENT DOCUMENTS

| 5,270,827 | A | * | 12/1993 | Kobayashi et al. | ........ 358/3.02 |
| 5,524,070 | A | * | 6/1996 | Shin et al. | .................. 382/274 |
| 6,195,467 | B1 | | 2/2001 | Asimopoulos et al. | |
| 6,621,595 | B1 | * | 9/2003 | Fan et al. | .................. 358/3.26 |
| 6,915,024 | B1 | * | 7/2005 | Maurer | ....................... 382/274 |

FOREIGN PATENT DOCUMENTS

WO    WO 02/27657    4/2002

* cited by examiner

*Primary Examiner*—Andrew W. Johns
*Assistant Examiner*—Patrick L. Edwards

(57) ABSTRACT

Processing of a pixel of a digital image includes sharpening a digital image, while boldening dark features in the digital image as a non-decreasing function of local contrast.

15 Claims, 3 Drawing Sheets

SELECTIVE THICKENING OF DARK FEATURES BY BIASED SHARPENING FILTERS

BACKGROUND

Image sharpening is performed to improve the appearance of digital images and particularly the legibility of documents. Most filters that perform image sharpening use variations of unsharp masking, a linear sharpening filter, which generates overshoots and undershoots at abrupt edges. Unsharp masking tends to produce visually favorable results for natural images, but not for document images. In images of documents, the unsharp masking can create overshoot artifacts, which reduce image compressibility of text-rich images.

An alternative to unsharp masking is based on the mathematical morphology approach, which is frequently reduced to combinations of neighborhood-minimum and neighborhood-maximum filters. Morphological filters that combine smoothing and sharpening, such as the Mean of Least Variance (MLV) filter and variants of toggle mapping filter, tend to strongly posterize images, i.e. reduce original images to piecewise constant intensity functions. While this effect can be desirable for purely textual images or medical images, it does not yield visually acceptable results for compound document images, which may also contain photos, variable backgrounds, and other image regions that do not correspond to piecewise constant intensity profiles.

SUMMARY

According to one aspect of the present invention, processing of a pixel of a digital image includes sharpening a digital image, while boldening dark features in the digital image as a non-decreasing function of local contrast Other aspects and advantages of the present invention will become apparent from the following detailed description, taken in conjunction with the accompanying drawings, illustrating by way of example the principles of the present invention.

DETAILED DESCRIPTION

Figure 1:
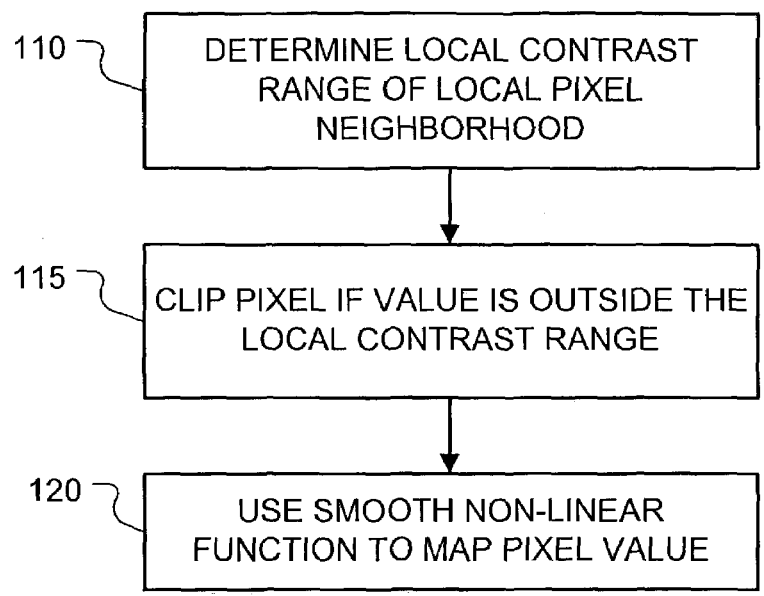
FIG. 1 is an illustration of a digital image processing method in accordance with an embodiment of the present invention.

Reference is made to FIG. 1, which illustrates a method of performing variable contrast mapping on a grayscale digital image. The variable contrast mapping is performed on a pixel-by-pixel basis. On each pixel of interest, the variable contrast mapping includes determining minimum and maximum intensity values and a local contrast range of a local pixel neighborhood (110); and mapping intensity of the pixel of interest as a smooth, non-linear continuous function of its intensity value, and the minimum and maximum intensity values (120). The mapped value remains within the local contrast range. This non-linear function will be referred to as a "contrast mapping function."

The local contrast range (D) of a pixel of interest may be determined as difference between the corresponding minimum intensity value (m) and the corresponding maximum intensity value (M). Thus D=M−m. This range (D) can vary from pixel to pixel.

Figure 2:
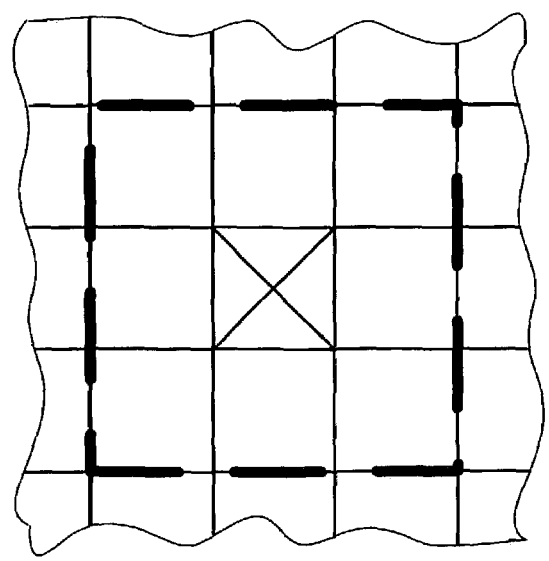
FIG. 2 is an illustration of an exemplary neighborhood of pixels for the method of FIG. 1.

An exemplary local neighborhood is illustrated in FIG. 2. The exemplary local neighborhood is delineated by a window indicated in dashed lines. Preferably, the neighborhood should be symmetric about the pixel of interest (the pixel of interest in FIG. 2 is marked with an "X"). A 3×3 local neighborhood is illustrated; however, the local neighborhood is not limited to any particular size or shape. The size and shape of the local neighborhood may even be changed dynamically to accommodate a particular class of image region (e.g., text, graphics, natural features). At boundary pixels and other pixels having partial neighborhoods, local minima and maxima of the partial neighborhoods may be used.

The middle of the local contrast range (the "mid-range point") is one-half the sum of the local maximum and local minimum. That is, the mid-range point A=(M+m)/2.

The local neighborhood may include the pixel of interest, or it may be punctured. A punctured neighborhood does not include the pixel of interest. The punctured neighborhood might be preferred for images containing halftone noise.

If the neighborhood is punctured, the value of the pixel of interest may be clipped to ensure that the value of the pixel of interest does not exceed the local maximum or fall below the local minimum (115). If the value of the pixel of interest is greater than the local maximum, the value is set equal to the local maximum. If the value of the pixel of interest is less than the local minimum, the value is set equal to the local minimum.

Figure 3:
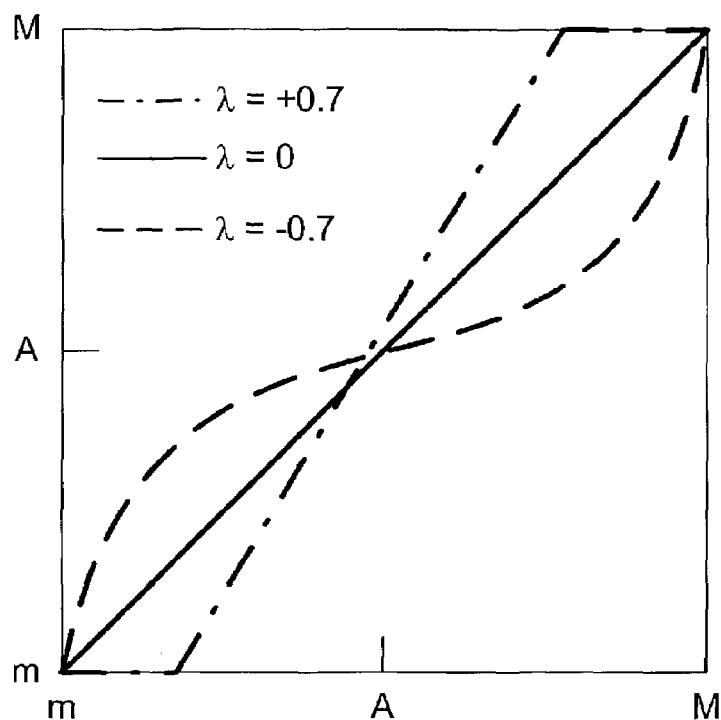
FIG. 3 is an illustration of an exemplary non-linear function for the method of FIG. 1.

The contrast mapping function may include a contrast-stretching parameter $\lambda(D)$, which is a function of the local contrast range (D). The contrast stretching parameter $\lambda(D)$ affects the slope of the non-linear function at the mid-range point. A contrast mapping function $F_\lambda(I)$ having a sigmoid shape and a slope of $1+\lambda$ is illustrated in FIG. 3. The effects of $\lambda=0$, $\lambda=-0.7$, and $\lambda=0.7$ are illustrated in FIG. 3. For this example, the contrast mapping function $F_\lambda(I)$ performs identity mapping for $\lambda=0$, contrast compaction for $\lambda<0$, and contrast stretching for $\lambda>0$. Thus the sign of the contrast stretching parameter ($\lambda$) determines whether contrast stretching or contrast compaction is performed, and the value of the contrast stretching parameter determines the amount of contrast stretching or contrast compaction. A negative value of the contrast stretching parameter can cause contrast compaction by pushing a pixel intensity value toward the mid-range point, and a positive value can cause contrast stretching by the pushing pixel intensity value away from the mid-range point.

The contrast-stretching parameter $\lambda(D)$ is a continuous, non-decreasing function of the local contrast range. It may have the following general characteristics. As D->0, $\lambda$-<-$\lambda_0$, which corresponds to maximum contrast compaction. For $0<D<T_1$ (low contrast ranges), contrast compaction is performed as a non-decreasing function of D. For $T_0 \leq D \leq T_1$, $\lambda(D)=0$, whereby identity mapping is performed. For $T_1<D<T_{MAX}$ (high contrast ranges), contrast mapping is performed as a non-decreasing function of D. The threshold $T_{MAX}$ corresponds to very strong edges. Maximum contrast mapping ($\lambda=\lambda_{MAX}$) is performed at $D=T_{MAX}$. For $D>T_{MAX}$, contrast mapping is performed at $\lambda=\lambda_{MAX}$ to prevent oversharpening of edges.

Figure 4:
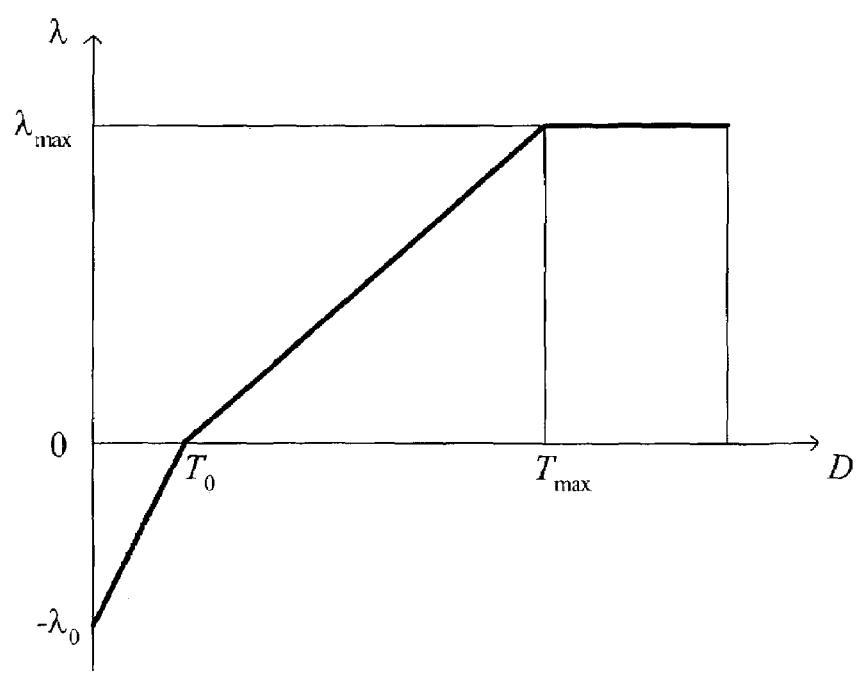
FIG. 4 is an illustration of a profile of a contrast-stretching parameter.

An exemplary profile for the contrast stretching parameter $\lambda(D)$ is shown in FIG. 4. The exemplary contrast-stretching parameter $\lambda$ has a piecewise-linear profile. Contrast compaction increases linearly from $-\lambda_0$ to 0 over the range $D=0$ to $D=T_0$. The range $D=T_0$ to $D=T_1$ shrinks to a single point, where identity mapping is performed ($\lambda=0$). Contrast stretching increases linearly from $\lambda(T_0)=0$ to $\lambda(T_{MAX})=\lambda_{MAX}$. Contrast stretching is performed at $\lambda=\lambda_{MAX}$ for $D>T_{MAX}$.

The contrast mapping function $F_\lambda(I)$ has the following constraints: (1) it is non-decreasing; (2) it produces filtered values that cover the entire local contrast range; and (3) it is symmetrical with respect to lightening and darkening about the mid-range point so that it identity-maps a pixel at its mid-range point. Because of constraints (1) and (2), the local minimum and local maximum values (m and M) are mapped to themselves. The non-linear function $F_\lambda(I)$ can perform clipping in addition to the clipping that might have been performed at step 115.

A generic expression for such a function $F_\lambda(I)$ may take the following form:

$$F_\lambda(I) = \begin{cases} I > M: & M \\ |I-A| \leq \frac{1}{2}D: & \min\{M, \max[m, I+\lambda \cdot K(I)]\} \\ I < m: & m \end{cases}$$

where I represents pixel intensity, and K(I) denotes a contrast stretching term, which depends parametrically upon M,m and complies with the following constraints:

(a1) vanishes at three points: $K(m)=K(M)=K(A)=0$.
(a2) has the same sign as I–A: $\text{sgn}(K(I))=\text{sgn}(I-A)$.
(a3) has unity derivative at I=A: $K'(A)=1$.

Following constraint (a3), the derivative of $F_\lambda(I)$ at the mid-range point (A) is $1+\lambda$.

The function K(I) may be expressed as a cubic polynomial in I, which is proportional to a product derived from the constraint (a1).

$$K(I) = \frac{(I-A) \cdot (M-I) \cdot (I-m)}{\left(\frac{1}{2}D\right)^2}$$

Other functions with similar properties could be used. For example, the contrast stretching term could take the following form.

$$K(I) = \frac{D}{2\pi} \cdot \sin\left(2\pi \cdot \frac{I-A}{D}\right).$$

The variable contrast mapping can adaptively perform contrast stretching and contrast compaction without creating artifacts. Strong contrast stretching is applied to strong edges (e.g., computer-generated features, text) mild contrast stretching to mild edges (e.g., edges in natural features), and contrast compaction in low contrast neighborhoods (e.g., patches that do not contain edges).

The variable contrast mapping sharpens edges without enhancing low amplitude noise. Halftone noise is not enhanced, and can even be partly smoothed. Overshoot is prevented. Consequently, compressibility of the contrast-mapped image is not reduced relative to the original image, and can even be increased.

The variable contrast mapping can be modified to perform "selective thickening" of narrow, dark features such as lines and text. The selective thickening may be performed to compensate for a psycho-visual effect that results from excessive contrast stretching and other types of sharpening. The excessive contrast stretching appears to make narrow dark features thinner at normal viewing distance, since the human eye is more sensitive to the lighter side of a dark feature. Thus sharpened, narrow, dark features appear thinner at normal viewing distance, even though they really aren't thinner. The selective thickening can be used to make the narrow dark features bolder and appear to have the correct thickness at normal viewing distance.

The modified contrast mapping function $F_{\lambda,t}(I)$ complies with the same first and second constraints as the function $F_\lambda(I)$ above: (1) non-decreasing; and (2) producing filtered values that cover the entire local contrast range. However, the modified contrast mapping function $F_{\lambda,t}(I)$ complies with a third constraint that is generalized from $F_\lambda(A)=A$ to $F_{80,t}(A_t)=A$, where the "lightened inverse mid-point" $A_t$ is defined as $A_t \equiv A+\Delta A_t$, where $\Delta A_t$ is a prescribed horizontal shift of the mid-range. This horizontal mid-range shift $\Delta A_t$ is proportional to the contrast range. For example, $$\Delta A_i = t \cdot \frac{D}{2},$$

where t is a dimensionless thickening parameter.

A generic expression for such a function $F_{\lambda,t}(I)$ may take the following form $$F_\lambda(I) = \begin{cases} I > M: & M \\ |I-A| \leq \frac{1}{2}\Delta A_i: & \min\{M, \max[m, I+\lambda \cdot K_t(I) - B_t(I)]\} \\ I < m: & m \end{cases}$$

$K_t(I)$ is a contrast stretching term, which complies with the following constraints:

(b1) vanishes at three points: $K_t(m)=K_t(M)=K_t(A_t)=0$.
(b2) has the same sign as $I-A_t$: $\text{sgn}(K_t(I))=\text{sgn}(I-A_t)$.
(b3) has unity derivative at I=A: $K_t'(A)=1$.

$B_t(I)$ is a boldening term which complies with the following constraints:

(c1) vanishes at the two end points: $B_t(m)=B_t(M)=0$
(c2) is non-negative: $B_t(I) \geq 0$
(c3) causes maximum boldening at I=A: $B_t'(A)=0$
(c4) its derivative corresponds to the prescribed horizontal shift at $I=A_t$: $B_t'(A_t)=A_t-A=\Delta A_t$ The constraints (b1) and (c1) together ensure that the modified contrast mapping function $F_{\lambda,t}(I)$ identity-maps the two end points. Constraints (b2) and (c2) together ensure that the modified contrast mapping function $F_{\lambda,t}(I)$ is below the identity map (i.e. darkens) up to a value that is lighter than $A_t$. Constraints (b3) and (c3) together cause the modified curve to have the same slope at the mid-range point A as the original curve, i.e. they are parallel at that point.

Constraints (c4) and (b1) ensure that the modified contrast mapping function $F_{\lambda,t}(I)$ passes through the third constraining point $F_{\lambda,t}(A_t)=A$.

Exemplary contrast stretching and boldening terms $K_t(I)$, $B_t(I)$ are as follows:

$$K_t(I) = \frac{(I-A_t)\cdot(M-I)\cdot(I-m)}{\left(\frac{D}{2}\right)^2}$$

$$B_t(I) = \frac{t}{(1-t^2)}\cdot\frac{(M-I)\cdot(I-m)}{\left(\frac{D}{2}\right)}$$

Figure 5:
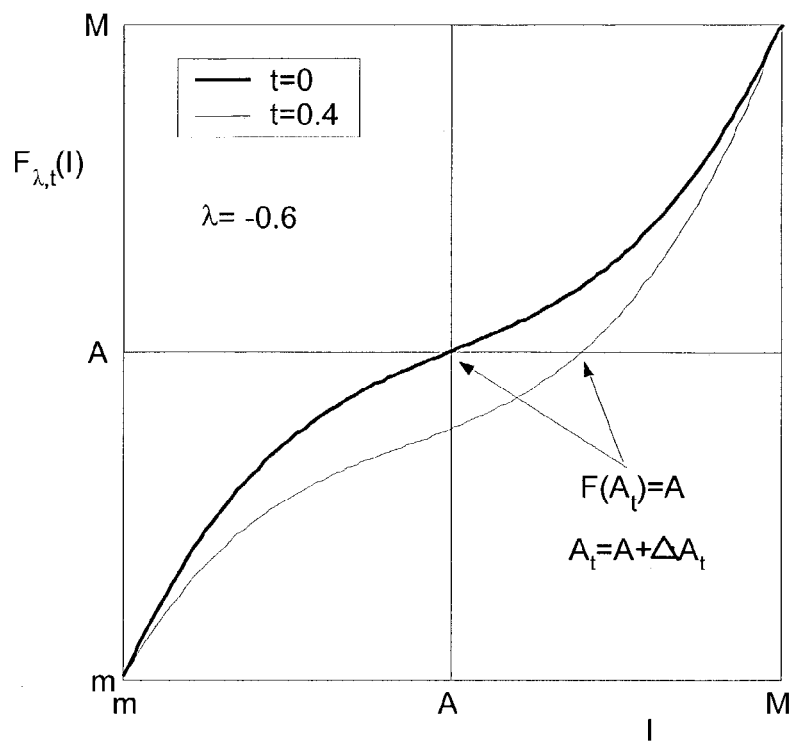
FIG. 5 is an illustration of another exemplary non-linear function for the method of FIG. 1.

FIG. 5 illustrates the horizontal mid-range shift. Shown in solid is an exemplary unshifted contrast mapping function $F_\lambda(I)$. Shown in dash is the exemplary modified contrast mapping function $F_{\lambda,t}(I)$ for t=0.4. Because of the horizontal mid-range shift, the modified contrast mapping function $F_{\lambda,t}(I)$ is not symmetrical with respect to lightening and darkening about A. A point lighter than the mid-range point by a prescribed amount ($\Delta A_t$) is mapped to the mid-range point.

Because the shift is defined on the horizontal axis (and not the vertical axis), there is a correspondence between t and the geometric shift in the location of the mid-range point A at edges. The horizontal mid-range shift corresponds to thickening, not darkening. Among the advantages, a uniform value of t causes the same thickening to edges for different contrast ranges. The uniform value of the contrast mapping parameter t causes the most darkening on the light side of a strong edge, some darkening on the light side of a mild edge, and very little darkening in low contrast regions. Slight darkening in low contrast regions, if not desired, can be avoided by setting t=0 when D is less than a threshold.

The actual value of the selective thickening parameter is application-specific. A value for the selective thickening parameter (t) can be selected to allow more aggressive contrast stretching without thinning. However, this value can be increased so that the dark features appear even thicker, or this value can be decreased so that the dark features appear thinner, but not as thin as without selective thickening. Thus thinning may be undercompensated for values of t between 0 and $t_c$ (where t=0 results in no thickening, and t=$t_c$ results in compensative thickening), or thinning may be overcompensated for values t greater than $t_c$.

Figure 6:
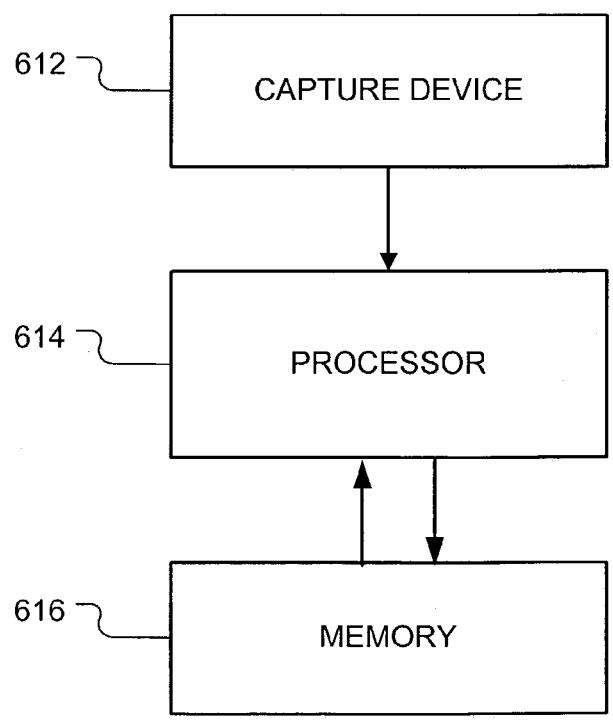
FIG. 6 is an illustration of a digital imaging system including a machine for performing the method of FIG. 1.

FIG. 6 shows a digital imaging system 610. An image capture device 612 provides lines of a digital image to a processor 614. The processor 614 may store all of the lines of the digital image in memory 616 for processing at a later time, or it may process the digital image in real time. The processed image may also be stored in the memory 616. The processor 614 may use hardware, software or a combination of the two to process the digital image according to the method of FIG. 1. The processor may perform additional processing as well.

In a software implementation, the memory 616 stores a program that, when executed, instructs the processor 614 to perform the method of FIG. 1. The processor 614 and memory 616 may be part of a personal computer or workstation, they may be embedded in an image capture device, etc.

In both hardware and software implementations, the processing can be performed using only integer arithmetic and precomputed lookup table terms. Thus the variable contrast mapping can be implemented in a very efficient manner. Moreover, the variable contrast mapping can be performed in real time.

The variable contrast mapping is not limited to any particular type of image. It may be applied to images containing only text and other computer-generated features, images containing only natural features, and compound documents containing natural features and computer-generated features.

The variable contrast mapping may be "bootstrapped" onto another processing method that determines minimum and maximum pixel intensity values for neighborhoods of pixels. For example, the variable contrast mapping may be bootstrapped onto the bleed through reduction method disclosed in assignee's U.S. Ser. No. 10/376,888.

Thus far the variable contrast mapping has been described with respect to a grayscale digital image. However, the variable contrast mapping can be extended to color images. In perceptual color space, where luminance is decoupled from chrominance (e.g., $YC_rC_b$, YUV, Lab), the variable contrast mapping may be applied to the luminance channel. Conventional sharpening may be used on the chrominance channels. However, the sharpening of the chrominance channels is optional, since the human visual system is less sensitive to chrominance than luminance.

The variable contrast mapping may be performed on multiple channels, wherein the contrast-stretching parameter is coordinated between the multiple channels. As a first example, the variable contrast mapping may be used to sharpen or smooth the chrominance channels in addition to the luminance channel. The pixel values of each chrominance channel are converted to chrominance intensities (in $YC_bC_r$ color space, for example, the chromatic intensity of a pixel may be computed as $C=\sqrt{C_b^2+C_r^2}$). A local contrast range of chrominance intensities is computed for each pixel in each chrominance channel. The contrast stretching parameter that was used to map the luminance component of a pixel is also used to map the chrominance components of that pixel, but as a function of the local contrast range of chrominance intensities.

As a second example, the image is initially in a non-perceptual color space such as RGB (in which luminance and chrominance are not decoupled). For each pixel, the luminance component is computed and mapped, and the difference between the original value and the mapped luminance value is determined. That difference is used to modify each component in non-perceptual color space. For example, the RGB triplet of a pixel is [100, 150, 200]. If the luminance is reduced by 50 gray levels, the RGB value may be modified by reducing each component by 50 gray levels to [50, 100, 150]. In the alternative, the RGB components may be multiplied by the ratio of mapped luminance to original luminance. Clipping may be applied to the resulting pixel values to ensure that the RGB results of the transformed image are within the RGB gamut. A more sophisticated gamut mapping may be performed instead of clipping to maintain color fidelity.

As a third example, the variable contrast mapping may be applied to each channel in RGB color space. For each pixel, local contrast range and a contrast-stretching parameter are determined for each color component, and a single contrast-stretching parameter is selected. That single contrast-stretching parameter is used to map each color component of the pixel. The single parameter used in the mapping may be a linear combination of the three individual parameters, the maximum of the three parameters, etc. Use of the single parameter can avoid color fringes.

The selective thickening is not limited to filters that perform variable contrast mapping. Unsharp masking filters and other sharpening filters can be modified to perform selective thickening. These filters may be modified to perform more sharpening of dark features at dark sides of edges. The resulting imbalance between the dark and light sides of an edge creates the perception of a shift in location of the edge center, which results in the perception of a thicker, darker edge. The selective boldening may be performed as a non-decreasing function of local contrast.

Consider a linear unsharp masking (sharpening) filter that has the form $F_\zeta(I)=I+\zeta \cdot (I-L)$, where $\zeta$ is a sharpening factor, and L is the result of applying a spatial low-pass filter with its center located on the pixel of interest. Such a filter can perform selective thickening simply by shifting the argument by $\Delta A_t$, where t is the dimensionless thickening parameter. Thus the linear sharpening filter modified to perform selective thickening may have the form $F_{\zeta,t}(I)=I-\Delta A_t+\zeta \cdot (I-\Delta A_t-L)$.

In this more general application, $\Delta A_t$ may be proportional to the spatial gradient of the intensity (I), wherein $$\Delta A_t = t \cdot |\nabla I| = t \cdot \sqrt{(\partial_x I)^2 + (\partial_y I)^2}.$$

According to this definition for $\Delta A_t$, the selective darkening is very small, even negligible, in low-contrast (low-gradient) neighborhoods. Using this definition for $\Delta A_t$, the parameter t retains its meaning for the geometric shift of the edge center, as with variable contrast mapping.

In addition to making $\Delta A_t$ depend on the gradient, the sharpening factor can also depend on the gradient in order to avoid sharpening of noise in low-gradient neighborhoods, which is also analogous to variable contrast mapping ($\lambda(|\nabla I|)$ instead of $\lambda(D)$). However, the selective sharpening is independent of the thickening.

Selective thickening can be applied without performing sharpening by setting the sharpening factor $\zeta$ to $\zeta=0$. Thus $F_t(I)=I-t\cdot|\nabla I|$. This holds true for variable contrast mapping, where $\lambda(D)=0$.

The present invention is not limited to the specific embodiments described and illustrated above. Instead, the invention is construed according to the claims that follow.

The invention claimed is:

1. A method of processing a digital image, the method comprising sharpening the digital image, while boldening dark features in the digital image as a non-decreasing function of local contrast; wherein the sharpening is performed as a linear function of pixel intensity; and wherein the dark feature thickening is performed by selectively shifting the pixel intensity toward darker tones.

2. The method of claim 1, wherein the shift is proportional to a gradient of the intensity and a thickening parameter.

3. The method of claim 1, wherein the boldening and sharpening are a function of a gradient of pixel intensity.

4. The method of claim 1, wherein the dark feature thickening is performed without sharpening on selected pixels.

5. A method of processing a digital image, the method comprising sharpening the digital image, while boldening dark features in the digital image as a non-decreasing function of local contrast; wherein the sharpening is performed as a non-decreasing function that produces filtered values that do not exceed a local contrast range, and identity-maps minimum and maximum values of the local contrast range; and that maps a point lighter than a mid-range point by a prescribed amount to the mid-range point.

6. A method of processing a digital image, the method comprising sharpening the digital image, while boldening dark features in the digital image as a non-decreasing function of local contrast; wherein the sharpening is a function of local contrast range and a selective thickening parameter, the selective thickening parameter causing a central horizontal shift of the mapping function, the shift proportional to the local contrast and the thickening parameter.

7. The method of claim 6, wherein the sharpening function has the general form $$F_{\lambda,t}(I) = \begin{cases} I > M: & M \\ |I - A| \leq \Delta A_i: & \min\{M, \max[m, I + \lambda \cdot K_t(I) - B_t(I)]\} \\ I < m: & m \end{cases}.$$

8. Apparatus for processing a digital image, the apparatus comprising a processor for performing sharpening on the digital image and selective thickening on dark, narrow features in the digital image to compensate for excessive sharpening; wherein the sharpening is performed as a linear function of pixel intensity; and wherein the selective thickening is performed by selectively shifting pixel intensity toward darker tones.

9. The apparatus of claim 8, wherein the shift is a function of a gradient of the intensity and a thickening parameter.

10. The apparatus of claim 8, wherein the sharpening and the thickening are a function of a gradient of pixel intensity.

11. The apparatus of claim 8 wherein the thickening is performed without sharpening on selected pixels.

12. Apparatus for processing a digital image, the apparatus comprising a processor for performing sharpening on the digital image and selective thickening on dark, narrow features in the digital image to compensate for excessive sharpening; wherein the sharpening (a) is performed as a non-decreasing function that produces filtered values that do not exceed a local contrast range, (b) identity-maps minimum and maximum values of the local contrast range; and (c) maps a point lighter than a mid-range point by a prescribed amount to the mid-range point.

13. Apparatus for processing a digital image, the apparatus comprising a processor for performing sharpening on the digital image and selective thickening on dark, narrow features in the digital image to compensate for excessive sharpening; wherein the sharpening includes variable contrast mapping.

14. The apparatus of claim 13, wherein the variable contrast mapping also performs the selective thickening.

15. The apparatus of claim 14, wherein the variable contrast mapping includes a mapping function and a selective thickening parameter, the selective thickening parameter causing a central horizontal shift of the mapping function.

* * * * *